United States Patent
Bucevschi et al.

(10) Patent No.: US 12,533,657 B2
(45) Date of Patent: Jan. 27, 2026

(54) LIQUID POLYMER SOLUTION FOR TREATING NONWOVEN WEBS

(71) Applicant: POLYGREEN LTD, Tel Aviv (IL)

(72) Inventors: Mircea Dan Bucevschi, Rehovot (IL); Zvi Meiri, Netanya (IL); Shai Shahal, Tel Aviv (IL)

(73) Assignee: POLYGREEN LTD, Tel Aviv (IL)

( * ) Notice: Subject to any disclaimer, the term of this patent is extended or adjusted under 35 U.S.C. 154(b) by 1251 days.

(21) Appl. No.: 17/044,724

(22) PCT Filed: Apr. 2, 2019

(86) PCT No.: PCT/US2019/025361
§ 371 (c)(1),
(2) Date: Oct. 1, 2020

(87) PCT Pub. No.: WO2019/195271
PCT Pub. Date: Oct. 10, 2019

(65) Prior Publication Data
US 2021/0187477 A1    Jun. 24, 2021

Related U.S. Application Data

(60) Provisional application No. 62/651,417, filed on Apr. 2, 2018.

(51) Int. Cl.
*B01J 20/26*     (2006.01)
*A61L 15/22*     (2006.01)
(Continued)

(52) U.S. Cl.
CPC .......... *B01J 20/267* (2013.01); *A61L 15/225* (2013.01); *A61L 15/42* (2013.01); *A61L 15/46* (2013.01);
(Continued)

(58) Field of Classification Search
CPC . B01J 20/267; B01J 20/28011; B01J 20/3297
(Continued)

(56) References Cited

U.S. PATENT DOCUMENTS 2,479,522 A    8/1949  Strain
2,640,819 A    6/1953  Barrett
(Continued)

FOREIGN PATENT DOCUMENTS

CN        1175216 A     3/1998
CN      106146156 A    11/2016
(Continued)

OTHER PUBLICATIONS

Preparation and Performance Study of Smart Hydrogel Based on Methyl Vinyl Ether-Maleic Acid Alternating Copolymer, Ma Xiao'e, China Doctoral Dissertations/Master's Theses Full-Text Database, Medicine/Health (Series E), 2017, No. 02, E079-24.
(Continued)

*Primary Examiner* — Tahseen Khan
(74) *Attorney, Agent, or Firm* — FISHERBROYLES LLP; Roger L. Browdy

(57) ABSTRACT

The present invention relates to a process for production of water-absorbing textile composite materials comprising the use of a polymeric composite solution and a textile material (non-woven, woven and other). The textile material is impregnated with the composite polymeric solution, which after thermal treatment is cross-linked in situ. More particularly, the present invention relates to an absorbent textile composite article comprising textile fibers and a polymers network interpenetrating the textile fibers, the polymers network comprising natural polymer crosslinked to synthetic polymer in the absence of non-polymeric crosslinking agent. The textile composite article exhibits excellent absor-
(Continued)

bency of aqueous media such as food liquids, cosmetic liquids, pharmaceutical liquids or human body secretions.

18 Claims, 2 Drawing Sheets

(51) Int. Cl.
  *A61L 15/42*    (2006.01)
  *A61L 15/46*    (2006.01)
  *B01J 20/28*    (2006.01)
  *B01J 20/30*    (2006.01)
  *B01J 20/32*    (2006.01)
  *D06M 15/05*    (2006.01)
  *D06M 15/11*    (2006.01)
  *D06M 15/13*    (2006.01)
  *D06M 15/233*    (2006.01)
  *D06M 15/263*    (2006.01)
  *D06M 23/06*    (2006.01)
  *D06M 101/06*    (2006.01)

(52) U.S. Cl.
  CPC ... *B01J 20/28011* (2013.01); *B01J 20/28038* (2013.01); *B01J 20/3085* (2013.01); *B01J 20/3276* (2013.01); *B01J 20/3297* (2013.01); *D06M 15/05* (2013.01); *D06M 15/11* (2013.01); *D06M 15/13* (2013.01); *D06M 15/233* (2013.01); *D06M 15/263* (2013.01); *D06M 23/06* (2013.01); *D06M 2101/06* (2013.01)

(58) Field of Classification Search
  USPC .......................................................... 428/219
  See application file for complete search history.

(56) References Cited

U.S. PATENT DOCUMENTS

| | | |
|---|---|---|
| 2,855,387 A | 10/1958 | Barrett |
| 2,988,539 A | 6/1961 | Cohen et al. |
| 2,996,480 A | 8/1961 | Mulloy et al. |
| 3,393,168 A | 7/1968 | Johnson et al. |
| 3,514,419 A | 5/1970 | Durlow et al. |
| 3,926,891 A | 12/1975 | Gross et al. |
| 3,933,747 A | 1/1976 | Nowak et al. |
| 3,948,866 A | 4/1976 | Pennewiss et al. |
| 3,954,721 A | 5/1976 | Gross |
| 3,959,569 A | 5/1976 | Burkholder, Jr. |
| 3,966,902 A | 6/1976 | Chromecek |
| 3,980,663 A | 9/1976 | Gross |
| 3,983,095 A | 9/1976 | Bashaw et al. |
| 3,983,271 A | 9/1976 | Pangle, Jr. et al. |
| 3,989,586 A | 11/1976 | Bashaw et al. |
| 3,993,553 A | 11/1976 | Assarsson et al. |
| 3,997,484 A | 12/1976 | Weaver et al. |
| 4,034,014 A | 7/1977 | Curtis, Jr. et al. |
| 4,036,788 A | 7/1977 | Steckler |
| 4,041,228 A | 8/1977 | Gross |
| 4,051,311 A | 9/1977 | Lee |
| 4,057,521 A | 11/1977 | Gross |
| 4,058,124 A | 11/1977 | Yen et al. |
| 4,066,584 A | 1/1978 | Allen et al. |
| 4,076,673 A | 2/1978 | Burkholder, Jr. |
| 4,076,917 A | 2/1978 | Swift et al. |
| 4,101,606 A | 7/1978 | Cenci et al. |
| 4,116,899 A | 9/1978 | Fanta et al. |
| 4,117,184 A | 9/1978 | Erickson et al. |
| 4,154,646 A | 5/1979 | Rave |
| 4,155,957 A | 5/1979 | Sasayama |
| 4,163,092 A | 7/1979 | Steckler |
| 4,167,464 A | 9/1979 | George |
| 4,210,489 A | 7/1980 | Markofsky |
| 4,238,374 A | 12/1980 | Durham et al. |
| 4,241,537 A | 12/1980 | Wood |
| 4,242,408 A | 12/1980 | Evani et al. |
| 4,251,643 A | 2/1981 | Harada et al. |
| 4,320,040 A | 3/1982 | Fujita et al. |
| 4,340,706 A | 7/1982 | Obayashi et al. |
| 4,389,513 A | 6/1983 | Miyazaki |
| 4,390,672 A | 6/1983 | von Bonin |
| 4,402,725 A | 9/1983 | Heller et al. |
| 4,418,163 A | 11/1983 | Murakami et al. |
| 4,468,343 A | 8/1984 | Butler et al. |
| 4,469,502 A | 9/1984 | Heller et al. |
| 4,483,950 A | 11/1984 | Fanta et al. |
| 4,500,670 A | 2/1985 | McKinley et al. |
| 4,537,590 A | 8/1985 | Pieniak et al. |
| 4,540,454 A | 9/1985 | Pieniak et al. |
| 4,573,988 A | 3/1986 | Pieniak et al. |
| 4,666,983 A | 5/1987 | Tsubakimoto et al. |
| 4,676,784 A | 6/1987 | Erdman et al. |
| 4,698,404 A | 10/1987 | Cramm et al. |
| 4,703,108 A | 10/1987 | Silver et al. |
| 4,731,067 A | 3/1988 | Le-Khac |
| 4,734,478 A | 3/1988 | Tsubakimoto et al. |
| 4,758,617 A | 7/1988 | Tanioku et al. |
| 4,771,105 A | 9/1988 | Shirai et al. |
| 4,820,773 A | 4/1989 | Alexander et al. |
| 4,824,901 A | 4/1989 | Alexander et al. |
| 4,855,179 A | 8/1989 | Bourland et al. |
| 4,861,539 A | 8/1989 | Allen et al. |
| 4,880,868 A | 11/1989 | Le-Khac |
| 4,888,238 A | 12/1989 | Katz et al. |
| 4,950,692 A | 8/1990 | Lewis et al. |
| 4,954,562 A | 9/1990 | Anderson |
| 4,962,172 A | 10/1990 | Allen et al. |
| 4,963,638 A | 10/1990 | Pazos et al. |
| 4,971,954 A | 11/1990 | Brodsky et al. |
| 5,002,986 A | 3/1991 | Fujiura et al. |
| 5,013,349 A | 5/1991 | Tanaka |
| 5,026,784 A | 6/1991 | Le-Khac |
| 5,115,011 A | 5/1992 | Harada et al. |
| 5,183,707 A | 2/1993 | Herron et al. |
| 5,221,787 A | 6/1993 | Robison et al. |
| 5,280,079 A | 1/1994 | Allen et al. |
| 5,312,661 A | 5/1994 | Suzuki et al. |
| 5,340,853 A | 8/1994 | Chmelir et al. |
| 5,382,270 A | 1/1995 | Graham et al. |
| 5,385,729 A | 1/1995 | Prencipe et al. |
| 5,413,747 A | 5/1995 | Akers et al. |
| 5,447,727 A | 9/1995 | Graham |
| 5,466,731 A | 11/1995 | Akers et al. |
| 5,525,682 A | 6/1996 | Nagatomo et al. |
| 5,567,478 A | 10/1996 | Houben et al. |
| 5,572,827 A | 11/1996 | Conrad |
| 5,645,542 A * | 7/1997 | Anjur ................. A61L 15/60 604/367 |
| 5,693,707 A | 12/1997 | Cheng et al. |
| 5,698,074 A | 12/1997 | Barcus et al. |
| 5,703,186 A | 12/1997 | Sezi et al. |
| 5,712,316 A | 1/1998 | Dahmen et al. |
| 5,720,736 A | 2/1998 | Hatsuda et al. |
| 5,733,576 A | 3/1998 | Chmelir |
| 5,733,994 A | 3/1998 | Koepff et al. |
| 5,791,085 A | 8/1998 | Szmidt et al. |
| 5,827,259 A | 10/1998 | Laux et al. |
| 5,840,804 A | 11/1998 | Carl et al. |
| 5,846,214 A | 12/1998 | Makuuchi et al. |
| 5,847,089 A | 12/1998 | Damodaran et al. |
| 5,866,678 A | 2/1999 | Kajikawa et al. |
| 5,962,068 A | 10/1999 | Tsuchiya et al. |
| 5,986,042 A | 11/1999 | Irizato et al. |
| 5,997,791 A | 12/1999 | Chou et al. |
| 5,998,312 A | 12/1999 | Kroesbergen |
| 5,998,491 A | 12/1999 | Haar, Jr. |
| 5,998,492 A | 12/1999 | Haar, Jr. et al. |
| 6,060,557 A | 5/2000 | Dahmen et al. |
| 6,066,325 A | 5/2000 | Wallace et al. |
| 6,087,448 A | 7/2000 | Mitchell et al. |
| 6,150,495 A | 11/2000 | Chou et al. |
| 6,162,541 A | 12/2000 | Chou et al. |
| 6,241,713 B1 | 6/2001 | Gross et al. |

(56) References Cited

U.S. PATENT DOCUMENTS

| | | | |
|---|---|---|---|
| 6,309,454 | B1 | 10/2001 | Friedman et al. |
| 6,310,105 | B1 | 10/2001 | Damodaran |
| 6,326,446 | B2 | 12/2001 | Carter |
| 6,342,652 | B1 | 1/2002 | Harada et al. |
| 6,376,618 | B1 | 4/2002 | Mitchell et al. |
| 6,410,616 | B1 | 6/2002 | Harada et al. |
| 6,417,425 | B1 | 7/2002 | Whitmore et al. |
| 6,506,696 | B2 | 1/2003 | Goldstein et al. |
| 6,630,422 | B1 | 10/2003 | Sannino et al. |
| 6,645,407 | B2 | 11/2003 | Kellenberger et al. |
| 6,660,819 | B2 | 12/2003 | Chmelir et al. |
| 6,689,378 | B1 | 2/2004 | Sun et al. |
| 6,710,141 | B1 | 3/2004 | Heide et al. |
| 6,720,402 | B2 | 4/2004 | Langer |
| 6,773,746 | B1 | 8/2004 | Bell |
| 6,800,712 | B2 | 10/2004 | Doane et al. |
| 6,821,331 | B2 | 11/2004 | Damodaran |
| 6,833,488 | B2 | 12/2004 | Bucevschi et al. |
| 7,009,020 | B2 | 3/2006 | Doane et al. |
| 7,071,327 | B2 | 7/2006 | Mensitieri et al. |
| 7,163,563 | B2 | 1/2007 | Schwartz et al. |
| 7,166,356 | B2 | 1/2007 | Flohr |
| 7,300,965 | B2 | 11/2007 | Weerawarna et al. |
| 7,423,090 | B2 | 9/2008 | Doane et al. |
| 7,423,106 | B2 | 9/2008 | Doane et al. |
| 7,459,501 | B2 | 12/2008 | Doane et al. |
| 7,985,819 | B2 | 7/2011 | Bucevschi et al. |
| 8,013,083 | B2 | 9/2011 | Kosover et al. |
| 8,022,140 | B2 | 9/2011 | Tikart et al. |
| 8,378,022 | B2 | 2/2013 | Bucevschi et al. |
| 8,596,931 | B2 | 12/2013 | Nagashima et al. |
| 2002/0193516 | A1* | 12/2002 | Bucevschi ............... A61L 15/60 525/54.1 |
| 2003/0120231 | A1 | 6/2003 | Wang et al. |
| 2004/0054341 | A1 | 3/2004 | Kellenberger et al. |
| 2008/0200616 | A1 | 8/2008 | Tanizaki et al. |
| 2008/0227944 | A1 | 9/2008 | Ambrosio et al. |
| 2009/0306290 | A1 | 12/2009 | Bucevschi et al. |
| 2009/0324537 | A1 | 12/2009 | Bucevschi et al. |
| 2010/0139347 | A1 | 6/2010 | Barati et al. |
| 2010/0234233 | A1 | 9/2010 | Ambrosio et al. |
| 2012/0267570 | A1 | 10/2012 | Shi et al. |
| 2016/0316759 | A1 | 11/2016 | Bougoure et al. |
| 2017/0044711 | A1 | 2/2017 | Canepa |
| 2018/0354869 | A1 | 12/2018 | Zhu et al. |
| 2021/0147588 | A1 | 5/2021 | Bucevschi et al. |

FOREIGN PATENT DOCUMENTS

| | | |
|---|---|---|
| CN | 106348949 A | 1/2017 |
| EP | 0722971 B1 | 3/1993 |
| EP | 0722971 A2 | 7/1996 |
| EP | 2277557 | 6/2014 |
| GB | 929409 A | 6/1963 |
| JP | H06122708 A | 5/1994 |
| JP | 2004-339496 A | 12/2004 |
| JP | 2006008800 A | 1/2006 |
| WO | 2001030407 A1 | 5/2001 |
| WO | 2005/084724 | 9/2005 |
| WO | 2006069732 | 7/2006 |
| WO | 2007/115169 | 10/2007 |
| WO | 2009/014824 | 1/2009 |
| WO | 2008120742 A1 | 7/2010 |
| WO | 2011141526 A1 | 11/2011 |
| WO | 2016/090330 A1 | 6/2016 |
| WO | 2019195272 A1 | 10/2019 |

OTHER PUBLICATIONS

Xia Yuzheng and Chen Xiaonong, Fine Polymer Chemicals and Applications, Chemical Industry Press, pp. 101-104 (2000).

Bakass M., Mokhlisse A., Lallemant M. [2002 "Absorption and Desorption of Liquid Water by a Superabsorbent Polymer: Effect of Polymer in the Drying of the Soil and the Quality of Certain Plants" J Appl Polym Sci vol. 83: 234-243.

Akhter J., Mahmood K., Malik K.A.,. Mardan A, Ahmad M., Iqbal M.M, [2004] Effects of hydrogel amendment on water storage of sandy loam and loam soils and seedling growth of barley,wheat and chickpea Plant Soil Environ. vol. 50: 463-469.

Yangyuoru M., Boateng E., Adiku S.G. ,KAcquah D. [2006] "Effects of Natural and Synthetic Soil Conditioners on Soil Moisture Retention and Maize Yield" West Africa Journal of Applied Ecology (WAJAE),vol. 9 : 1-8.

Wang Y.T. , Greg L.L. [1989]. "Hydrophilic polymers-their response to soil amendments and effect on properties of a soilless potting mix". J. Amer. Soc. Hort. Sci. vol. 115 : 943-948.

Puoci F., Iemma F., Spizzirri U. G., Cirillo G., Curcio M., Picci N. [2008] "Polymer in Agriculture: a Review" Am. J. Agri. Biol. Sci., vol. 3 : 299-314.

El Hady O.A., Tayel M.Y. ,Lofty A.A. [1981]. Super gel as a soil conditioner. II. Its effects on plant growth, enzyme activity, water use efficiency and nutrient uptake. Acta Horticulturae vol. 19 : 257-265.

Milimouk I., Hecht A.M., Beysens D., Geissler E. [2001] "Swelling of neutralized polyelectrolyte gels" Polymer vol. 42 : 487-494.

Zohuriaan-Mehr M. J., Kabiri K. [2008] "Superabsorbent Polymer Materials: A Review" Iranian Polymer Journal vol. 17 : 451-477.

Capezza Villa AJ, "Novel superabsorbent materials obtained from plant proteins" 2017. p. 28, Capezza Villa AJ. Dec. 31, 2017.

Enas M. Ahmed Hydrogel: Preparation, characterization and applications: A review, Journal of Advanced Research vol. 6, Issue 2, Mar. 2015, pp. 105-121.

Fidelia Nnadi and Chris Brave "Environmentally friendly superabsorbent polymers for water conservation in agricultural ands"— Journal of Soil Science and Environmental Management vol. 2(7), pp. 206-211, Jul. 2011.

Giuseppe Cannazza, Andrea Cataldo, Egidio De Benedetto, Christian Demitri , Marta Madaghiele and Alessandro Sannino "Experimental Assessment of the Use of a Novel Superabsorbent polymer (SAP) for the Optimization of Water Consumption in Agricultural Irrigation Process"—Water 2014, 6, 2056-2069.

Deniz Aydemir, Alper Kiziltas, Gokhan Gunduz "Natural Fillers-filled Styrene-Maleic Anhydride Copolymer Composites"—Wood Research—60(1):2015, 167-174.

Sahibi Belkhiria, Thhierry Mieyer, Albert Renken "Styrene Maleic Anhydride Copolymerization in a Recycle Tubular Reactor; Reactor stability and Product Quality"—Chemical Engineering Science. vol. 49, No. 248, pp. 4981-4990. (1994).

Steffen Jockusch, Nicholas J. Turro, Yoshiro Mitsukami, Makoto Matsumoto—"Photoinduced Surface Crosslinking of Superabsorbent Polymer Particles"—J Appl Polym Sci 111: 2163-2170, (2009).

Hossein Hosseinzadeh "Synthesis and swelling properties of a poly(vinyl alcohol)-based superabsorbing hydrogel"—Current Chemistry Letters 2 (2013) 153-158.

Roman Geier, Christina Wappl, Hilde Freiszmuth, Christian Slugovc and Georg Gescheidt "Thermal effects in polymerisations—a live view differentiating between bulk effects, thermal diffusion, and oxygen inhibition"—| Polym. Chem., 2015, 6, 2488-2492.

Z. Florjanczyk et al.(2000) "Lithium gel polyelectrolytes based on crosslinked maleic anhydride-styrene copolymer" Electrochimica Acta 45 (2000) 3563-3571.

Rakesh Singh et al (2013). "Biodegradation of Styrene-Butadiene-Styrene Copolymer via Sugars Attached to the Polymer Chain" Advances in Materials Physics and Chemistry, 2013, 3, 112-118.

* cited by examiner

LIQUID POLYMER SOLUTION FOR TREATING NONWOVEN WEBS

FIELD OF THE INVENTION

The present invention relates to a process for production of water-absorbing textile material such as non-woven, woven or other textile materials types and related absorbing products.

BACKGROUND OF THE INVENTION

In art there are known processes to manufacture an absorbent textile material, which can be divided in two distinct classes: a) processes with textile fibers and polymeric absorbents, b) processes with prefabricated textile materials and reactive liquid media.

Forwards are discussed only the processes with prefabricated textile materials and reactive liquid media.
b) Processes with Prefabricated Textile Materials and Reactive Liquid Media Particularity of these processes consists in that, a traditional prefabricated textile material like nonwoven, woven, knitted or braided type, is impregnated with a fluid mass in solution, emulsion or suspension form, and a polymeric absorbent is generated in situ during the drying of the impregnated wet textile material, or after drying and applying of an adequate thermal treatment. Representative processes that are known in the art: b1) processes with polymerizable impregnation mass and b2) processes with cross-linkable impregnation mass.
b1) Processes with Polymerizable Impregnation Mass In these processes, a liquid used for impregnation produces in-situ polymerization of partially neutralized acid vinyl monomers directly on a synthetic nonwoven substrate. These processes can be found in U.S. Pat. Nos. 4,537,590; 4,540,454; 4,573,988; 4,676,784; 5,567,478; 5,962,068; 6,417,425 and 6,645,407.
b2) Processes with Cross-linkable Impregnation Mass In these processes, the textile material prefabricated as: nonwoven, woven or other known type is impregnated with a fluid mass in the form of solution or emulsion, that contains polymers in dissolution or dispersion state, or in mixture with auxiliary materials which are cross-linking agents active at temperatures and induce generation in situ of a polymeric absorbent. In this class can be seen more variants:
i) Processes with Impregnation Mass that Contain a Self-crosslinking Synthetic Polymer.

Various processes are described in which a substantially linear acrylic polymer is cross linked through its pendant groups. The pendant groups will react with each other upon appropriate heating. Any combination of monomers that will undergo such reaction can be used as in U.S. Pat. Nos. 4,057,521; 4,861,539; 4,962,172; 4,963,638; 5,280,079 and 5,413,747.

The impregnation mass based on self-crosslinking polymers has the disadvantage that the cross-linking is not complete and because of this reason more than 10% of end product is lost during processes associated with extraction of monomers, initiators and organic solvents residue used during polymerization. Moreover, the free absorbency of the resulting cross linked polymers has a low value (less than 50 g/g in 0.9% NaCl solution), and the product is not safe.
ii) Processes with Impregnation Mass that Contain Synthetic Polymers and Cross-linking Agents It is further known from U.S. Pat. Nos. 2,988,539; 3,393,168 and 3,514,419 that water swellable cross-linked carboxylic copolymers can be prepared. However, these prior art copolymers are all cross-linked during copolymerization or cross-linked after polymerization with subsequent neutralization of the carboxylic acid groups to form water swellable polyelectrolytes and hence these prior art polyelectrolytes cannot be cross-linked in situ as a coating on a substrate or as a flexible film thereof.

U.S. Pat. Nos. 3,926,891; 3,980,663 and 4,155,957 present chemical structures of the principal classes of combinations that can be used as cross-linking agents for polymers with free carboxylic chemical functions. Also is shown that cross-linking reaction occurs based on mechanism known as nucleophilic displacement on saturated carbon. The carboxylate ion on polymer acts as nucleophile while cross-linking agent is the substrate for nucleophilic attack.

Cheng et al. in U.S. Pat. No. 5,693,707 presents an aqueous polymer composition comprising 10 to 40 wt % of a polymer in water, the polymer consisting essentially of 20-90 wt % alpha,beta.-ethylenically unsaturated carboxylic acid monomer, 10-80 wt % one or more softening monomers, the aqueous composition being adjusted to pH 4-6 with alkali metal hydroxide or alkaline earth metal hydroxide and further containing 0.1 to 3 wt % zirconium cross-linking salt. Such aqueous compositions are applied to nonwoven and woven substrates to make absorbent textile web.

Goldstein et al. in U.S. Pat. No. 6,506,696 shows that the method of forming the high performance nonwoven webs of this invention comprises: applying an aqueous polymeric emulsion containing a polymer having dual cross-linkable functionality to a synthetic based nonwoven web, wherein the dual cross-linkable polymer incorporates acetoacetate functionality and carboxylic acid functionality; removing water and cross-linking the cross-linkable polymer with an effective amount of a polyaldehyde and an effective amount of a polyaziridine compound.

Soerens Dave Allen in U.S. Pat. No. 7,205,259 presents an absorbent binder desiccant composition which is capable of spontaneous cross-linking after application to a substrate, at a temperature of about 120° C. or less. The absorbent binder desiccant composition includes a monoethylenically unsaturated polymer, such as carboxylic acid, sulphonic acid, or phosphoric acid, or salts thereof, or a quaternary ammonium salt, and an acrylate or methacrylate ester that contains an alkoxysilane functionality, or a monomer capable of co-polymerization with a compound containing a trialkoxy silane functional group and subsequent reaction with water to form a silanol group, and a desiccant component. The absorbent binder desiccant composition is particularly suitable for use in manufacturing a wide variety of humidity control articles.

A diversity of chemical compositions (polymers and cross-linking agents) besides of multiple variants of control of cross-linking reactions are found in art in U.S. Pat. Nos. 3,983,271; 4,066,584; 4,320,040; 4,418,163; 4,731,067; 4,855,179; 4,880,868; 4,888,238; 5,698,074; 5,997,791; 6,150,495; 6,162,541; 6,241,713; 6,773,746 and 6,824,650.
iii) Processes with Impregnation Mass that Contain Biopolymers and Cross-linking Agents Weerawarna et al. in U.S. Pat. No. 7,300,965 provides a mixed polymer network having superabsorbent properties. The composition is obtainable by reacting a carboxyalkyl cellulose and a synthetic water-soluble polymer having carboxylic acid or carboxylic acid derivative substituents with a crosslinking agent. The cross-linking agent reacts with at least one of the carboxyalkyl cellulose or water-soluble polymer to provide the network. Suitable cross-linking agents include cross-linking agents that are reactive toward carboxylic acid groups.

Representative organic cross-linking agents that are reactive toward carboxylic acid groups include diols and polyols, diamines and polyamines, diepoxides and polyepoxides, polyoxazoline functionalized polymers, and aminols having one or more amino groups and one or more hydroxy groups.

Representative inorganic cross-linking agents that are reactive toward carboxylic acid groups include polyvalent cations and polycationic polymers. Exemplary inorganic cross-linking agents include aluminum chloride, aluminum sulfate, and ammonium zirconium carbonate with or without carboxylic acid ligands such as succinic acid (dicarboxylic acid), citric acid (tricarboxylic acid), and butane tetracarboxylic acid (tetracarboxylic acid). Water soluble salts of trivalent iron and divalent zinc and copper can be used as cross-linking agents. Representative carboxylic acid cross-linking agents includes di- and polycarboxylic acids. U.S. Pat. Nos. 5,137,537; 5,183,707 and 5,190,563 describe the use of C2-C9 polycarboxylic acids that contain at least three carboxyl groups (e.g., citric acid and oxydisuccinic acid) as crosslinking agents. Suitable polycarboxylic acid crosslinking agents include citric acid, tartaric acid, malic acid, succinic acid, glutaric acid, citraconic acid, itaconic acid, tartrate monosuccinic acid, maleic acid, 1,2,3-propane tricarboxylic acid, 1,2,3,4-butanetetracarboxylic acid, all-cis-cyclopentane tetracarboxylic acid, tetrahydrofuran tetracarboxylic acid, 1,2,4,5-benzenetetracarboxylic acid, and benzenehexacarboxylic acid. The cross-linking can be achieved by heating at a temperature and for a period sufficient to effect the cross-linking. The carboxymethyl cellulose solution containing cross-linking agent or synthetic water-soluble polymer and cross-linking agent can be air-dried or solvent precipitated followed by cross-linking. Cross-linking time and temperature will depend on the cross-linking agent and polymers used.

Sun et al. in U.S. Pat. No. 6,689,378 presents methods of immobilizing uncomplexed cyclodextrins and complexed cyclodextrins to polysaccharide containing substrates, such as cellulose fibers by covalently bonding. The cellulose/cyclodextrin compositions can be used in all types of cellulose fiber containing articles, such as tissues and personal care articles.

Useful polymeric anionic reactive compounds are compounds having repeating units containing two or more anionic functional groups that will covalently bond to hydroxyl groups of the substrate. Exemplary polymeric anionic reactive compounds include the ethylene/maleic anhydride copolymers described in U.S. Pat. No. 4,210,489. Vinyl/maleic anhydride copolymers and copolymers of epichlorohydrin and maleic anhydride or phthalic anhydride are other examples. Copolymers of maleic anhydride with olefins can also be considered, including poly(styrene/maleic anhydride)

Copolymers and terpolymers of maleic anhydride that could be used are disclosed in U.S. Pat. No. 4,242,408.

The cross-linkable impregnation mass, similar to polymerizable systems in situ have disadvantage that the cross-linking is not complete in conditions of thermal treatment mentioned, existing permanent the possibility that during uses of textile products to extract besides soluble polymer also cross-linking agent, this being more dangerous for the human healthy comparatively with the monomers or polymerization auxiliary residues. Presence of biopolymers in mixture for treating of textile materials, not contribute to improving the chemical transformation yield that occurs during cross-linking. Referring to uses of macromolecular cross-linking agents, these products being in their turn result of synthesis processes are not mentioned their purity or the extractability in aqueous solutions used as swelling media.

A particular drawback of known processes in the art for obtaining absorbent textiles is that those products are not ecological. Majority of polymeric absorbents discussed above, are products of synthesis, which because of their chemical structure have not the capacity of biodegradation in specific active biological media, i.e. the domestic compost. Moreover, absorbent textiles that contain biopolymers, although are biodegradable, have small values of free absorbency. Another drawback of known absorbent textiles is that the polymer network included in such textiles was obtained through the use of crosslinking agents that might present health hazards to end users.

SUMMARY OF THE INVENTION

The present invention eliminates the disadvantages of processes known in art for obtaining absorbent textiles, by providing a new process for treating textiles and forming new textile composite article with improved water absorbance and biodegradability. The new process makes use of an aqueous textile-impregnating polymeric composition in solution form and containing at least two types of soluble polymers—a synthetic polymer and a natural polymer, the composition being devoid of separate non-polymer cross-linking agent. The two types of polymers are combined in a predefined ratio that is chosen such that when the textile is impregnated with the polymeric composition and is exposed to heat treatment, the polymers interpenetrate into the textile fibers and undergo self crosslinking into the textile. The resulting composite textile in dry form has a free absorbance capability which is higher by at least 10% when compared to the non-impregnated textile material, depending on the liquid medium type that is in contact. The resulting textile is also characterized by high biodegradability. More specifically, the resulting composite textile in dry form has a free absorbance capability which is higher by at least 10%, preferably higher by at least 20%, more preferably higher by 30%, 40% 50%, 60%, 70%, 80%, 90% or higher, when compared to the non-impregnated textile material.

The terms fabric, textile, web, with or without being combined with the word "material" are used in this specification interchangeably.

Another object of the invention is to provide a textile composite article comprising fibers and polymers network interpenetrating the textile fibers, the polymers network comprising natural polymer crosslinked to synthetic polymer in the absence of non-polymeric crosslinking agent. The textile composite article has a water absorbance by at least 50% higher in comparison to same textile without said polymers network interpenetrating into the textile fibers.

Another object of the present invention is to provide a new type of polymeric composition, in which the natural polymer activates the biodegradation of the synthetic polymer and confers to the system superior biodegradability.

Another object of the present invention is to provide a new type of polymeric composition made of at least two types of soluble polymers—a synthetic polymer and a natural polymer, in which the natural polymer activates under heat the crosslinking of the synthetic polymer and confers to a textile impregnated with such composition and dried, superior free absorbance when exposed to aqueous liquids.

The natural polymer is a biopolymer that functions as both cross-linking agent of the synthetic polymer and as activator of biodegradation processes.

Another object of the present invention is to provide a textile composite article having an internal pattern of an interpenetrating polymeric material which penetrates at least partially within the textile, leading to a pattern of impregnated areas in the textile. Following heat treatment and drying of the impregnated textile, a textile composite article is obtained, having improved water absorbance when exposed to aqueous liquids.

Another object of the present invention is to provide a new type of polymeric network composition in stable aqueous solution which is compatible with different additives used in the textile industry, for example plasticizers, active surface agents, dyers, perfumes, anti-odorants, bacteriostatic agents etc., without affecting the water absorptive performance or biodegradability of the textile material.

Another object of the present invention is to provide a new type of polymeric network composition, in solution form, which is suited to be used as impregnation mass for any nonwoven, woven or knitted textile materials made either from synthetic fibers (polypropylene, polyester, polyvinyl alcohol, etc), from natural fibers (cellulose, viscose, cotton, wool, PLA, etc.), or from mixtures of synthetic and natural fibers, preferably with a density of 30-90 g/m². The textile materials may be biodegradable by themselves such as for example when made of PLA or may become biodegradable following impregnation with the polymeric network and drying to form the composite absorbent textile of the invention.

Another object of the present invention is to provide a new type of polymeric aqueous composition, which after heat-driven elimination of water from textile material impregnated with such composition followed by self cross-linking, it gives rise to a composite absorbent textile material with free spaces that permit fast access and absorption of liquid media in the textile material when the textile is exposed to aqueous liquids.

The combination ratio of the two polymers in water is preferably chosen to obtain an aqueous solution that is thermodynamically stable and suitable for impregnation into fabrics, and that undergoes self-cross-linking under controlled thermal conditions (temperature and time).

A textile material treated according to the invention with the polymeric composition is characterized by improved water absorbance and biodegradability. With reference to biodegradability, when the textile comes into contact with an aqueous biological media and starts absorbency of this media, the composite polymeric material impregnated within the textile is swelling and is transforming in a gel like material within the textile or on its surface (textile function as a support).

According to other embodiments of the present invention, there is provided a polymeric composite solution for use in forming an absorbent textile material that both in dry form and gel form resulting after swelling in different aqueous media, it is still safe when in contact with the human body and which is environmentally friendly, conferring a pronounced ecologic character to textile materials used.

According to another aspect, the invention provides a process for the preparation of polymeric composite aqueous solution to be used in improving water absorbency of substrates e.g. fabrics treated with the polymeric composite, the process comprising the following steps:
  a) preparation of alkaline base solution
  b) preparation of aqueous solution of synthetic polymer (SP) in acidic form, which is treated afterwards with the alkaline solution from (a) to obtain the salt form, at a concentration of between 1% and 10%, preferably between 2 and 5% by weight,
  c) preparation under heating of aqueous solution of natural polymer NP at a concentration between 1% and 10%, preferably between 2 and 5% by weight
  d) mixing under heating and stirring the SP solution obtained in (b) in salt form, with the NP solution obtained in (c) to obtain aqueous stable composite solution of polymers suitable to be used as impregnation mass that confers high water absorbance to textile materials and optionally
  e) adding to the aqueous composite solution obtained in (d) at least one auxiliary material selected from the list of plasticizers, surface agents, deodorants, perfume and preservatives.

According to preferred embodiments, synthetic polymers (SPs) used in the invention are made of monomers bearing carboxylic acid or carboxylic acid anhydride groups. More specifically, SPs suitable to be used in this invention are linear or branched graft homo- or copolymers made from vinyl acidic monomers such as acrylic acid, maleic anhydride, itaconic anhydride and similar, optionally in association with other types of vinylic monomers that do not necessarily contain carboxylic acid functions.

Preferably, the natural polymer is a biopolymer selected from a protein, soybean protein, collagen, collagenic biopolymer, gelatin, collagen hydrolysate, albumin, guar or starch and casein.

Preferably, the synthetic polymer is a copolymer based on maleic anhydride (maleic acid), e.g. copolymers of styrene maleic anhydride (SMA), copolymers olefins with maleic anhydride such as of isobutylene and maleic anhydride (e.g. commercially available copolymers sold under the tradename Isobam™) or copolymers of methyl vinyl ether and maleic acid (e.g. commercially available copolymers sold under the tradename Gantrez™), poly(decyl vinyl ether-alt-maleic anhydride), poly(ethyl vinyl ether-alt-maleic anhydride), poly(maleic acid-co-propene), poly(n-butyl vinyl ether-alt-maleic anhydride), poly(octadecene-alt-maleic anhydride), polypropylene-alt-maleic acid) or poly(maleic acid-co-dodecyl methacrylate).

According to preferred embodiments, the content of total free carboxylic acid groups in the SPs of the invention range from 0.009 to 0.015 mole/gram SP. More specifically, the free carboxylic acid groups of synthetic polymer SP are in salt state, corresponding to a degree of neutralization between 49 to 99%, preferably between 60 to 95%, and most preferably between 65 to 90%.

According to preferred embodiments, the average molecular weight of SP used in the invention is from 50 KDa to 1,000 KDa, preferably from 100 KDa to 750 KDa, more preferably from 150 KDa to 500 kDa.

According to preferred embodiments the natural polymer NP used in the invention is a biopolymer selected from polypeptides, proteins, polysaccharides, polyesters and lignin (in native forms or modified by chemical or enzymatic hydrolysis). More preferably the NPs used in the invention are water soluble phospholipids such as lecithin, polypeptides or proteins such as gelatin, albumin and the like; or polysaccharides such as cellulose, alginate, dextran, chitosan, and the like; that have at least one of the following characteristics:
   a) average molecular weight from 5 to 100 KDa preferably from 25 to 50 KDa, more preferably from 75 to 100 KDa.
   b) free chemical groups such as amine or hydroxyl in a relative concentration from 0.005 to 0.01 mole/grams NP, more preferably from 0.001 to 0.002 mole/grams NP.
   c) hydrophilic, capable to form hydrogels in water environment and capable of integration within the textile fibers.

According to preferred embodiments the biopolymer used in the invention has the capability of cross-linking due to its $NH_2$ or OH groups that crosslink to COOH groups in the synthetic polymer under high temperature conditions and for selected periods of time, to form ester and amide bonds between polymers skeletons. Furthermore, the biopolymer of the invention activates the biodegradation of the textile impregnated with composite solution of SP and NP of the invention.

According to further preferred embodiments, the polymers composite solution used in the invention is a stable solution and may further contain at least one additive selected from plasticizers, antibacterial agents, surfactants, deodorants, perfume, preservatives etc. The polymers composite solution is suitable for impregnation into fabrics and also suitable for self-cross-linking under controlled conditions of temperature and time.

Preferably, the textile density is between 30 to 90 g/m² in order to allow sufficient penetration of composite polymer solution into the textile material.

BRIEF DESCRIPTION OF THE DRAWINGS

The invention will now be described with reference to the drawings, wherein.

DETAILED DESCRIPTION OF THE INVENTION

Figure 1:
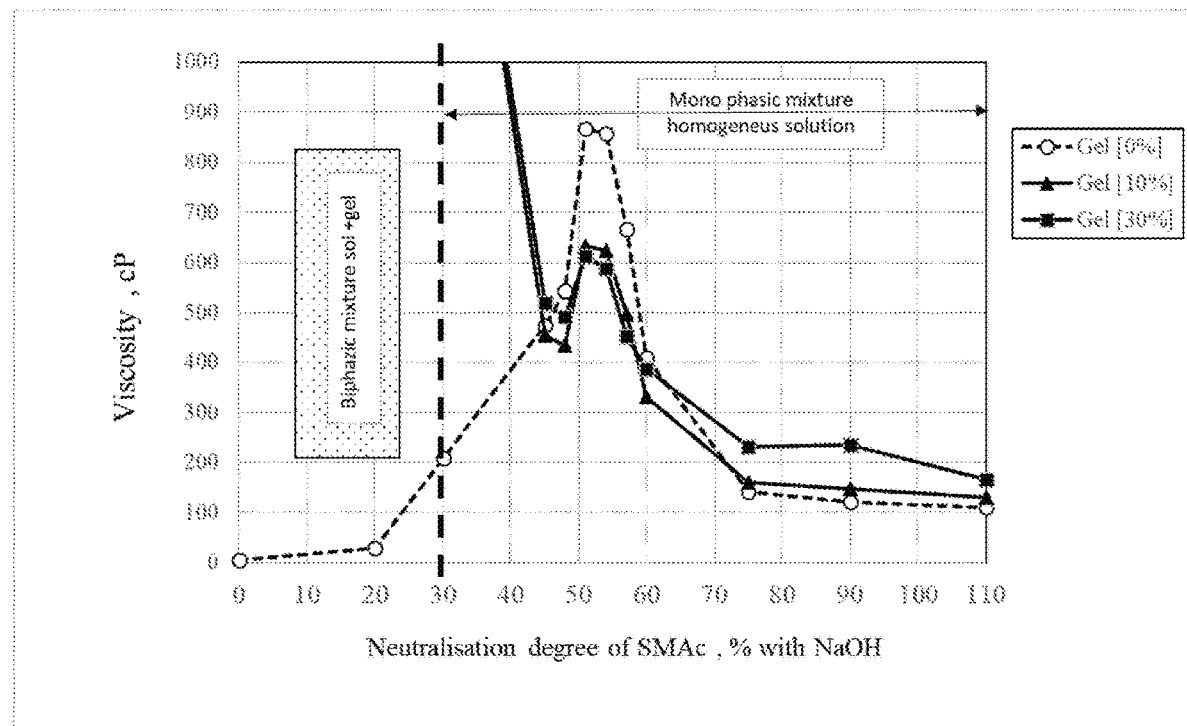
FIG. 1 is a graph showing the correlation between the viscosity of SP-NP composite solutions, the degree of neutralization of the synthetic polymer (SP) and solution stability. The SP is represented by SMAC (Styrene Maleic Acid Copolymer) in salt form following neutralization with sodium hydroxide. The natural polymer (NP) is represented by gelatin. The following polymer solutions were tested: 100% SMAC; 90% SMAC and 10% Gelatin; 70% SMAC and 30% Gelatin. The SMAC used had different degrees of neutralization as further explained in Example 1. From FIG. 1 it is noted that the presence of the natural polymer Gelatin leads to a decrease in the viscosity of the polymer composite solution if the degree of neutralization of the synthetic polymer is between 30-60%. If the degree of neutralization is greater than 60%, the presence of the natural polymer causes an increase in the viscosity value of the composite solutions in comparison to same solution without natural polymer. With reference to the stability of the composite polymer solutions, it is noted that the composite solutions containing SMAC and gelatin are stable if the degree of neutralization of the synthetic polymer SMAC is greater than 30%.

Polymeric composite solution which is within the objects of this invention is a new type of textiles treatment hereinafter termed Impregnation Composition (IC) which is used for treating any type of textiles, preferably nonwoven textiles, to produce high absorbent textile materials.

The polymer composite solution comprises synthetic polymer in the form of salt (SP), natural polymer (NP), additives (A) and water (W).

The ratio between a textile material TEX (before treatment) to impregnation composition IC[IC=SP+NP+A] is from 85:25 to 99:1% by dry weight.

The ratio between the synthetic polymer (SP) in salt form to natural polymer (NP) SP/NP is from 70:30 to 95:5% by dry weight.

The ratio of additives (A) to polymers A/(SP+NP) is from 0.5 to 5% dry weight.

Water content in the composite polymer solution is from 79 to 99% by weight. The synthetic polymer salt, SP may be a commercially available polymer, having the following characteristics:
   a) linear copolymers or branched graft homo- or copolymers that contain vinyl acidic monomers as: acrylic acid, maleic anhydride, itaconic anhydride and similar in association or not with other types of vinylic monomers which does not contain carboxylic groups.
   b) content of total free carboxylic groups from 0.009:0.0095 mol/gram to 0.01:0.0.15 mol/grams
   c) Free carboxylic groups of synthetic polymer, SP are in salt state, corresponding to a degree of neutralization between 49-99%, preferable between 60-95%, and most preferable between 65-90%;
   d) The salt state of synthetic polymer is obtained by using strong inorganic base substances such as hydroxides, bicarbonates or carbonates of lithium, sodium, potassium or ammonium, preferred hydroxides of lithium, sodium, potassium or ammonium.
   e) The average molecular weight of synthetic polymer, SP is from 50,000 Da to 1,000,000 Da, preferable from 100,000 Da to 750,000 Da, and most preferable from 150,000 Da to 500,000 Da.

The natural polymer, NP is preferably a commercially available biopolymer which belongs to the following classes of substances: proteins, carbohydrates, bio-polyesters or lignin (as native forms or modified by chemical or enzymatic hydrolysis); preferable are proteins and carbohydrates integral soluble in water and which have the following characteristics:
   d) The average molecular weight from 5,000 to 100,000 Da preferable from 25,000 to 50,000 more preferable from 75,000 to 100,000 Da.
   e) Free chemical functions as $NH_2$; $OH-CH_2$; $OH-C_6H_{3-5}$; as single type or more types which have content from 0.001 to 0.002 preferable from 0.005 to 0.01 mol/grams.

Suitable additives, A are: plasticizers, antibacterial agents, active surface agents, deodorants, perfume, preservatives etc., in quantities that are correlated with other properties than absorbency.

The polymer composite solution is a stable solution of polymer materials SP and NP, without phase separation under conditions of storage or ulterior processing.

Without being bound to theory, the polymer composite solution can interpenetrate within the textile fibers and self cross-link under conditions of thermal treatment at temperatures between 100 to 250° C. and during periods of preferably between 2 to 30 minutes.

The resulting textile is a composite textile article having an internal pattern of an interpenetrating polymeric material which penetrates at least partially within the textile. Following heat treatment at temperatures being 100 to 250° C. and drying of the impregnated textile, a textile composite article is obtained, having improved water absorbance when exposed to aqueous liquids.

Figure 4:
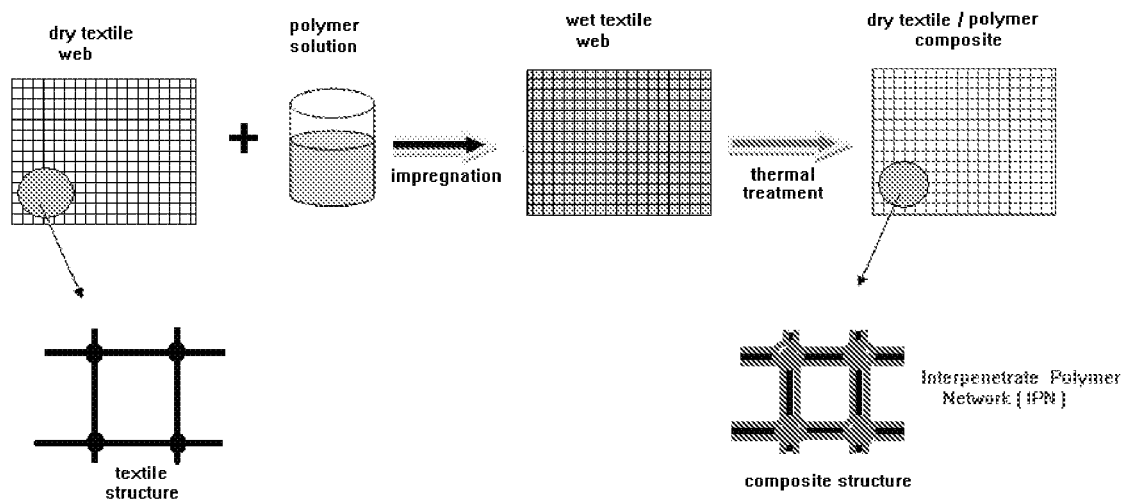
FIG. 4 is a schematic illustration of the process that occurs between a textile material and the polymers network under heating conditions to provide the textile composite article of the invention.

A schematic representation of the process that occurs between a textile material and the polymers network under heating conditions, to provide the textile composite article of the invention is shown in FIG. 4.

Preparation of polymeric composite aqueous solution to be used in improving water absorbency of substrates e.g. fabrics treated with the polymeric composite, comprises the following steps:
 a) preparation of alkaline base solution
 b) preparation of aqueous solution of synthetic polymer (SP) in acidic form, which is treated afterwards with the alkaline solution from (a) to obtain the salt form, at a concentration of between 1% and 10%, preferably between 2 and 5% by weight,
 c) preparation under heating of aqueous solution of natural polymer NP at a concentration between 1% and 10%, preferably between 2 and 5% by weight
 d) mixing under heating and stirring the SP solution obtained in (b) in salt form, with the NP solution obtained in (c) to obtain aqueous stable composite solution of polymers suitable to be used as impregnation mass that confers high water absorbance to textile materials and optionally
 e) adding to the aqueous composite solution obtained in (d) at least one auxiliary material selected from the list of plasticizers, surface agents, deodorants, perfume and preservatives.

Textile materials to be used with the polymer composite solution include prefabricate textile materials as: nonwoven, woven or any other type known in art and commercially available, formed from synthetic fibers or natural fibers or a mixture of synthetic and natural fibers. Preferred textile materials are made of synthetic fibers with a density of 30-90 $g/m^2$, preferable 40-80 $g/m^2$ and more preferable 50-70 $g/m^2$.

Impregnation of the textile material is done using any equipment known in art, for example spray devices; foulard; roll coating; reverse roll coating; knife devices etc.

Further processing of the wet textile material depends of initial density of material and of impregnation degree so chosen. For example:
 a) if the density of the textile material has been initially higher than 70 $g/m^2$, then the wet textile material is first dried in a stream of hot air at temperature of 50-90° C., preferable at temperature of 55-85° C., and most preferable at temperature of 60-80° C., so the solid composite (textile+composite polymer) resulted to have a humidity content less than 12% by weight, preferable less than 10% by weight, and most preferable less than 8% by weight and then the supplementary thermal treatment in hot air steam at temperature of 90-180° C., preferable at temperature of 100-170° C., and most preferable at temperature of 110-160° C., during a period of 5-180 minutes, preferable 10-150 minutes, and most preferable of 15-120 minutes;
 b) if the density of textile material has been initially less than 70 $g/m^2$ the wet textile material is subdue to a single thermal treatment at temperature of 100-150, during 180-300 seconds, preferable at temperature of 140-180° C. during 60-180 seconds and more preferable at temperature of 200-250° C. during 30-120 seconds.

Following the thermal treatment the textile material is let to cool at room temperature and in the end is packed.

The resulting textile material has improved water absorbance and can be used in a variety of applications such as for example cleaning wipes, household or institutional cleaning or maintenance, hand wipes, hand towels which allow a user to feel that the towel remains dry, but which also allow for absorption of moisture, personal hygiene, cosmetic or sanitary wipes, baby wipes, facial tissues, the core in panties or wound dressings, hygienic absorbent pads and any other same application.

Test Methods
 1. Characterization of Polymer Solutions Containing Synthetic Polymer, Natural Polymer and Auxiliary
  The viscosity of the solution was evaluated using a viscosimeter ViscoStar Plus, Fungilab, Spain using a volume of solution correlated to the type of spindle L1 at 25° C. temperature.
  The stability of the polymer solution used for impregnation was assessed to be stable or unstable if the analyte solution showed sediment after centrifugation of a volume of 25 ml solution at 5000 rpm for 30 minutes. Tests were performed with a laboratory centrifuge GLC-2B Sorvall, Thermo Scientific at ambient temperature.
 2. Free Absorbency
  The following measurements are made:
  Mtex, [grams], mass of the dried textile material used for impregnation by weighing at a semi-analytical balance
  Mtwstart, [grams]—mass of wet starting material by weighing the sample
  Mtid—[grams]—mass of drained textile material after impregnation
  MIC—[grams]—mass of dried polymeric composite material found in the textile after impregnation evaluated by the formula:

$$MIC = M\text{tex} * IMD/100, \text{ grams}$$

The degree of impregnation of a textile material is established using the formula:

$$[IMD]\text{dry} = IMC/(M\text{tex} + MIC) * 100, \%$$

Absorbency Evaluation of Textile Materials:
 2.1 Absorbency of textile material non-impregnated Q1 consists of introducing the textile sample, M-tex into a 150 ml volume of liquid to which the absorbance value is desired so that the entire surface of the textile material is covered by the liquid and the contact is maintained without shaking for 60 minutes. Ulterior, the material is removed from the liquid, it hangs in a vertical position to drain excess liquid for 15 minutes. The drained textile material sample is weighed and the value obtained is recorded as M-tex-wet.

Absorbency of non-impregnated textile material Q1 is obtained by using the formula:

$$Q1 = (M\text{-tex wet} - M\text{-tex})/M\text{-tex}, (g/g)$$

2.2 Absorbency of impregnated textile material Q2

The textile sample is weighted at technical balance obtaining the value Mtex. Then is impregnated with a chosen mass of liquid:distilled water, an impregnating solution or other type of solution by using a laboratory spray device. The wet material thus obtained is weighted again and the value is Mtwstart. If this value is higher than the impregnation degree (IMD)—pre-established the wet sample is subdue to a squeezing process with the aid of a glass rod to eliminate the excess of impregnation liquid so that it finally is obtained a wet sample with the mass Mtid. Next, the wet sample is kept for 30 minutes, in a closed glass beaker to avoid evaporation of the liquid.

The absorbency of textile material sample is obtained with formula:

$Q2\text{-}TEXIC = [Mtid-(MTex+MIC)]/(Mtex+MIC)$, (g/g)

2.3. Relative absorbency

RQ represents the ratio between absorbency of an impregnated textile material Q2 and absorbency of the same textile material non-impregnated Q1.

Relative absorbency is calculated by using the formula:

$[RQ]1 = Q2/Q1$ or $[RQ]2 = [(RQ1)-1]*100$, (%)

EXAMPLES

Example 1

Stock solutions of synthetic polymer, natural polymer and inorganic base are prepared as follows:
a) Stock of Synthetic Polymer Solution:

42.6 g of SMAc styrene/maleic acid copolymer [prepared as in U.S. Pat. No. 7,985,819] in powder form having an 8% moisture content with an average molecular weight of 450,000 Da containing 0.0091 mol/g free carboxylic groups together with 358 g of demineralized water were added to a mixing vessel with agitation and the content was mixed for 1 hour at 80° C. to complete dissolution of the synthetic polymer and is end by cooling the polymer solution to 40° C. Finally, 400 g of SMAc polymer solution of 10% by dry weight is obtained.
b) Stock of Sodium Hydroxide Solution Is prepared 400 g of NaOH solution of 10% dry weight (from 98.9% pure sodium hydroxide pellets) and demineralized water using a mixing vessel with agitation fitted with a heating-cooling jacket.
c) Stock of Natural Polymer Solution 400 g of gelatin type A solution with 200 Bloom and 14% moisture content (as natural polymer-NP) of 10% dry weight were prepared by dissolving 46.5 g of natural polymer in 354 g of demineralized water using a mixing vessel by stirring with a rotor speed not higher than 60 rpm, during a period of 1 hour at a temperature of 40° C. so as to ensure the perfect homogenization of the solution.

Further, the 3 types of solutions prepared above were used to prepare 3 sets of composite solutions by diluting with demineralized water the stock solutions as follows:

Set-SOL1 without gelatin made up of 12 solutions of 3% concentration in which the synthetic polymer has a different degree of neutralization between 0% and 110%.

Set-SOL-2 containing gelatin in proportion of 10% to SMAc consisting of 12 solutions of 3% concentration in which the synthetic polymer has a different degree of neutralization between 0% and 110% and Set-SOL-3 which contains gelatin in a proportion of 30% to SMAc consisting of 12 solutions of 3% concentration in which the synthetic polymer has a different degree of neutralization ranging between 0% and 110%.

All composite solutions corresponding to the three sets were characterized in terms of their viscosity and stability in the sense that the sample is unstable if it contains the insoluble phase and that the sample is stable if it is a homogeneous solution without the insoluble phase. The results obtained are presented in Table-1 and FIG. 1.

TABLE 1

Influence of the degree of neutralization of the synthetic polymer SPS and of the natural polymer NP content (as gelatin type A with 200 Bloom) in the composition SP:NP) on solutions' viscosity [η, (cP)] of 3% by dry weight.

| Neutralization degree of SP, [%] | Gel [0%] η; cP] | Gel [10%] η; cP] | Gel [30%] η; cP] |
|---|---|---|---|
| 0 | 4.3 | 2000 | 2000 |
| 2 | 28.7 | 1900 | 1900 |
| 3 | 209.6 | 1800 | 1800 |
| 45 | 473.6 | 454.3 | 519.2 |
| 48 | 543.7 | 432.8 | 491.3 |
| 51 | 867.5 | 634.1 | 612.6 |
| 54 | 858 | 624.8 | 589.2 |
| 57 | 667.1 | 496.7 | 452.2 |
| 60 | 409.5 | 330.6 | 386.8 |
| 75 | 141.7 | 160 | 231.4 |
| 90 | 120.1 | 147.3 | 234.8 |
| 110 | 110.4 | 129.5 | 165.9 |

From FIG. 1 it is noted that the presence of the natural polymer leads to a decrease in the viscosity of the synthetic polymer if the degree of neutralization of the synthetic polymer is between 30-60%. If the degree of neutralization is greater than 60%, the presence of the biopolymer determines the increase in the viscosity value of the composite solutions. From the point of view of the stability of the composite solutions, this is dependent on the degree of neutralization of the synthetic polymer. It has been noted that composite systems containing SMAc and gelatin are stable if the degree of neutralization of the synthetic polymer is greater than 30%.

Examples 2 to 5

In these examples, is presented the absorbency value to demineralized water (conductivity 2 micro S) of some nonwoven fabrics containing viscose fiber with density of 50 g/m² with different impregnation degree with polymeric solutions' concentration of 1% by weight containing SMAc (mentioned in Example 1) with neutralization degree of 59% generated with NaOH and various values of gelatin content and which additionally contains 1.5% by dry weight to the content of the polymeric composition.

The experiments were conducted as follows:

Textile materials having a mass of 0.5 g were impregnated with composite solutions prepared according to the method described in Example 1 by spraying with a laboratory device so as finally to obtain the impregnation degree pre-established, IMD, to the dry mass of the sample of dried fabric material. Further, the wet textile samples were placed in a hanging state in an oven with air circulation, preheated to 180° C. and are maintained at this temperature for 4 minutes. Finally, the sample was removed from the oven and allowed to cool at ambient temperature. Then the textile material was subjected to the absorbency test according to the methodology described in the chapter "Test methods".
Experimental conditions and results are shown in Table-2.

TABLE 2

The influence of gelatin content in the polymeric solution for impregnation and the impregnation degree on the absorbency of impregnated nonwoven

| Example cod | $[Q\text{-tex}]_{water}$ | Gelatin in Composite,% | IMD, % | $Q_2$-texic, (g/g) | $RQ_1$ |
|---|---|---|---|---|---|
| Exp-2 | 9.19 | 7.6 | 8 | 15.79 | 1.71 |
| Exp-3 | 9.19 | 9.7 | 10 | 12.08 | 1.39 |
| Exp-4 | 9.19 | 13.5 | 8 | 14.07 | 1.53 |
| Exp-5 | 9.19 | 17.6 | 12 | 15.49 | 1.68 |

Examples 6-12

In these examples are presented the impregnation of a textile material consisting of viscose fibers with a density of 50 g/m² using a solution of synthetic polymer SMAc with neutralization degree of 64% done by using NaOH, 3.6% gelatin to the polymeric composite at degree of impregnation of 20% with thermal treatment of 200° C. for 100 seconds using the same oven with air circulation mentioned in the previous examples. Finally, the absorbency of the textile sample was evaluated against various liquid media represented by simulated fluid secreted by the human body (Margareth R. C. Marques et al, Simulated Biological Fluids with Possible Application in Dissolution Testing, Dissolution Technologies August 2011, 1) The results are presented in Table-3

TABLE 3

Influence of the liquid medium's composition on the absorbency of textile materials impregnated with polymeric composites containing synthetic polymer and gelatin

| Examples code | Liquid media | M-tex [g] | IMD dry % | $Q_1$ [g/g] | $Q_2 t_{ex}$ [g/g] |
|---|---|---|---|---|---|
| Exp-6 | Distillated water 0.0002 mS | 0.5 | 15 | 29.03 | 50.48 |
| Exp-7 | Tap water 4 mS | 0.5 | 15 | 16.20 | 28.17 |
| Exp-8 | Salt water 0.9% 15.4 mS | 0.5 | 15 | 5.89 | 10.24 |
| Exp-9 | Bovine Milk (3%) | 0.5 | 15 | 5.11 | 8.88 |
| Exp-10 | Simulated Human Sweat[1] | 0.5 | 15 | 2.81 | 4.89 |
| Exp-11 | Simulated Wound Fluids[1] | 0.5 | 15 | 6.28 | 10.92 |
| Exp-12 | Simulated Saliva[1] | 0.5 | 15 | 7.63 | 13.26 |

Example-13

Figure 2:
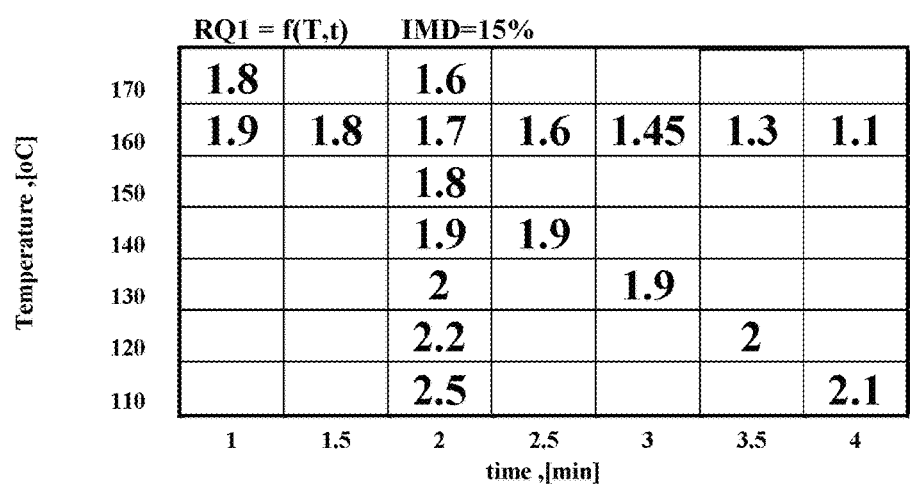
FIG. 2 is a graph showing the influence of thermal treatment to which is subdue a non-woven sample impregnated with the polymer composite solution containing synthetic polymer and gelatin on the relative absorbency $RQ_1$.

In this example is presented the influence of the temperature and the time of the thermal treatment at what is subjected a sample of textile material with a density of 50 g/m² in order to obtain an absorbent textile material on the relative absorption RQ1. The results are presented in FIG. 2.

The data obtained show that the thermal treatment of the impregnated fabrics must be in such manner as to obtain the highest value for absorbency. The lower values of the maximum result either because of a low crosslinking degree or because the degree of crosslinking of the polymeric composite is too high.

Example 14

This example shows the influence of the type of fiber from which the fabric is done subjected to impregnation.

For this purpose, a composite polymer solution having the chemical composition coinciding with Exp-2 was used.

Have been used textile materials from polypropylene fiber (PP-fiber), polyester fibers (PET-fiber) viscose fibers (Viscose-fiber).

Figure 3:
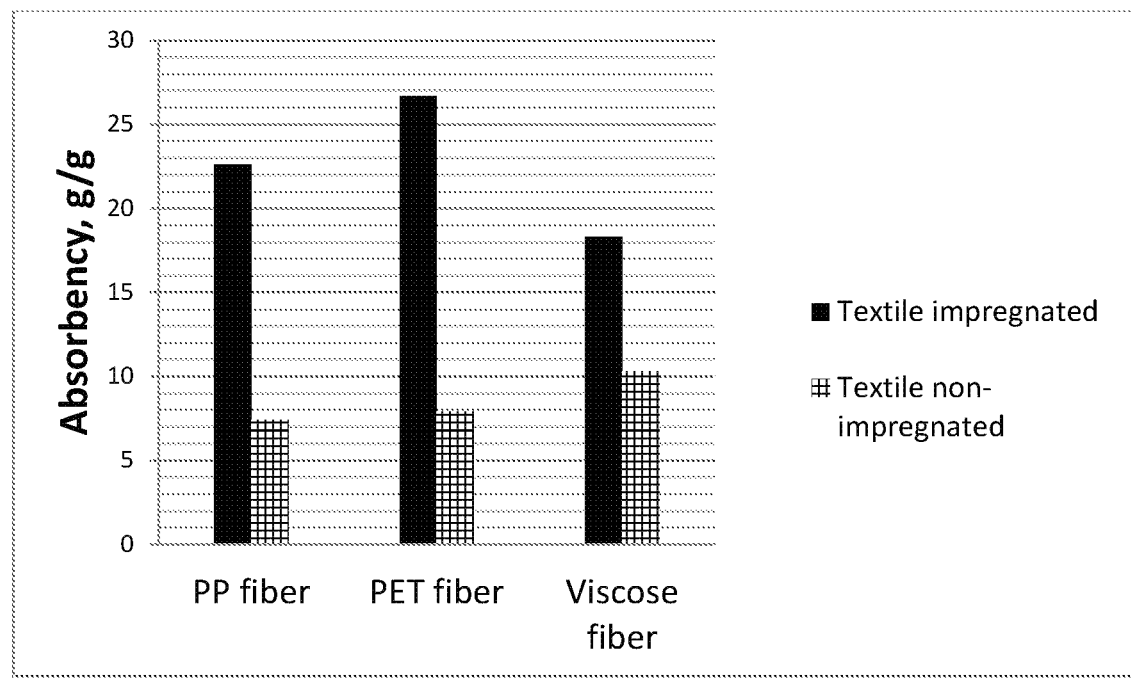
FIG. 3 is a graph showing the influence of the type of fibers on water absorbency for textile impregnated with the polymer composite vs. a textile non-impregnated.

The results obtained are presented in FIG. 3.

Examples 15-16

In these examples is presented the influence of the type of biopolymer used for the preparation of composite material according to the invention on the absorbency of a textile material using the preparation technology for the composite from Example l and the methodology of impregnation of the textile material from example 3.

Instead of gelatin have been used gum guar (G4129 Sigma Aldrich) and soluble starch (S9765 Sigma Aldrich).

TABLE 4

Influence of the biopolymer type (carbohydrates) on the absorbency of textile materials impregnated with polymeric composites containing synthetic polymer and biopolymer

| Example cod | Natural polymer type | Natural polymer in composite, % | IMD % | $Q_2$-texic, (g/g) |
|---|---|---|---|---|
| Exp-15 | Guar | 1.8 | 19 | 16.96 |
| Exp-16 | Starch | 2.3 | 28 | 20.44 |

ASPECTS IN THIS INVENTION

1. A polymer composite solution for treating any type of prefabricate textile material for production of high absorbent materials. The treated materials are preferable nonwoven.

2. The polymer solution comprises synthetic polymer SP in salt form, natural polymer NP, and optionally additives A and water W.

3. The ratio between prefabricate textile material TEX to impregnation composition IC=(SP+NP+A is from 85:25 to 99:1% by dry weight.
4. The ratio between the synthetic polymer salt SP to natural polymer NP is SP:NP from 70:30 to 95:5% by dry weight.
5. The ratio between additives A to polymers (SP+NP) is 0.5:5% by dry weight.
6. Water content of polymer solution is 79:99% by weight.
7. The synthetic polymer SP preferably in salt form is a commercially available polymer, with the following characteristics:
f) Configurations of synthetic polymer is: linear as copolymers or branch as graft homo- or copolymers which contain vinyl acidic monomers as: acrylic acid, maleic anhydride, itaconic anhydride and similar in association or not with other type of vinylic monomer which is not contain carboxylic chemical functions.
g) content of total free carboxylic chemical functions from 0.009:0.0095 mol/gram to 0.01:0.0.15 mol/grams
h) Free carboxylic chemical functions of synthetic copolymer SP are in salt state, corresponding to a degree of neutralization between 49-99%, preferable between 60-95%, and most preferable between 65-90%;
i) The salt state of synthetic polymer is resulted by using inorganic substances with intense basic character as hydroxides, bicarbonate or carbonate of lithium, sodium, potassium or ammonium, preferred being hydroxides
j) The average molecular weight of synthetic polymer SP is with value from 50,000 Da to 1,000,000 Da, preferable from 100,000 Da to 750,000 Da, and most preferable from 150,000 Da to 500,000 Da.
8. The natural polymer NP is preferably a commercially available biopolymer which belong to the following classes of substances: proteins, carbohydrates, biopolyesters or lignin (as native forms or modified by chemical or enzymatic hydrolysis); preferable are the proteins and carbohydrates integral soluble in water and which have the following characteristics:
a) The average molecular weight from 5,000 to 10,000 Da preferable from 25,000 to 50,000 more preferable from 75,000 to 100,000 Da
b) Free chemical functions as $NH_2$; $OH-CH_2$; $OH-C_6H_{3-5}$; as single type or more types which have content from 0.001 to 0.002 preferable from 0.005 to 0.01 mol/grams
9. Suitable additives A to be used are plasticizers, antibacterial agents, active surface agents, deodorants, perfume, preservatives etc., in quantities that are correlated with other properties than absorbency.
10. The polymer composite solution is a stable solution without phenomena of phase separation in conditions of storage or ulterior processing.
11. The polymer solution can generate three-dimensional macromolecular network material, in dry state by cross-linking in the inner of fibrous mass, in conditions of thermal treatment at temperature of 100-250° C. during 2-20 minutes.
12. Process for the preparation of polymeric composite aqueous solution to be used in improving water absorbency of substrates e.g. fabrics treated with the polymeric composite, the process comprising the following steps:
a) preparation of alkaline base solution
b) preparation of aqueous solution of synthetic polymer (SP) in acidic form, which is treated afterwards with the alkaline solution from (a) to obtain the salt form, at a concentration of between 1% and 10%, preferably between 2 and 5% by weight,
c) preparation under heating of aqueous solution of natural polymer NP at a concentration between 1% and 10%, preferably between 2 and 5% by weight
d) mixing under heating and stirring the SP solution obtained in (b) in salt form, with the NP solution obtained in (c) to obtain aqueous stable composite solution of polymers suitable to be used as impregnation mass that confers high water absorbance to textile materials and optionally
e) adding to the aqueous composite solution obtained in (d) at least one auxiliary material selected from the list of plasticizers, surface agents, deodorants, perfume and preservatives.
13. Textile materials to be used are nonwoven, woven or any other type known in art and commercial available, formed from synthetic fibers or natural fibers or a mixture of synthetic and natural fibers, preferred being the textile materials formed from synthetic fibers with a density of 30-90 $g/m^2$, preferable 40-80 $g/m^2$ and more preferable 50-70 $g/m^2$.
14. The polymer composite solution is used as a treating agent to obtain absorbent textile materials, as follows: impregnation of textile material using any equipment known in art, for example (spray devices; foulard; roll coating; reverse roll coating; knife devices etc.);
The processing of wet textile material depends of initial density of material and of impregnation degree so chosen:
a) if the density of textile material has been initially higher than 70 $g/m^2$ the wet textile material is first dried in current of hot air at temperature of 50-90° C., preferable at temperature of 55-85° C., and most preferable at temperature of 60-80° C., so the solid composite resulted to have a humidity content less than 12% by weight, preferable less than 10% by weight, and most preferable less than 8% by weight and then the supplementary thermal treatment in hot air current at temperature of 90-180° C., preferable at temperature of 100-170° C., and most preferable at temperature of 110-160° C., during a period of 5-180 minutes, preferable 10-150 minutes, and most preferable of 15-120 minutes;
b) if the density of textile material has been initially less than 70 $g/m^2$ the wet textile material is subdue to a single thermal treatment at temperature of 100-150° C., during 180-300 seconds, preferable at temperature of 140-180° C. during 60-180 seconds and more preferable at temperature of 200-250° C. during 30-120 seconds.
Following thermal treatment, the treated textile material is let to cool at room temperature and in the end is packed.
15. The resulting textile material with improved water absorbance can be used in a variety of applications such as for example: cleaning wipes, household or institutional cleaning or maintenance, hand wipes, hand towels which allow a user to feel that the towel remains dry, but which also allow for absorption of moisture, personal, cosmetic or sanitary wipes, baby wipes, facial tissues, hygienic absorbent pads and any other same application.

REFERENCES

Margareth R. C. Marques, Raimar Loebenberg, and May Almukainzi, Simulated Biological Fluids with Possible Application in Dissolution Testing Dissolution Technologies, August 2011, 1

U.S. Patent Documents

| | | |
|---|---|---|
| 2,988,539 | Cohen, et al. | Jun. 13, 1961 |
| 3,393,168 | Johnson, et al. | Jul. 16, 1968 |
| 3,514,419 | Durlow, et al. | May 26, 1970 |
| 3,926,891 | Gross, et al. | Dec. 16,1975 |
| 3,980,663 | Gross; James R. | Sep. 14, 1976 |
| 3,983,271 | Pangle, Jr., et al. | Sep. 28, 1976 |
| 4,057,521 | Gross; James R | Nov. 8, 1977 |
| 4,066,584 | Allen, et al. | Jan. 3, 1978 |
| 4,155,957 | Sasayama; Hiroharu | May 22, 1979 |
| 4,210,489 | Markofsky; Sheldon B. | Jul. 1, 1980 |
| 4,242,408 | Evani, et al. | Dec. 30, 1980 |
| 4,320,040 | Fujita, et al. | Mar. 16, 1982 |
| 4,418,163 | Murakami, et al. | Nov. 29, 1983 |
| 4,537,590 | Pieniak, et al. | Aug. 27, 1985 |
| 4,540,454 | Pieniak, et al. | Sep. 10, 1985 |
| 4,573,988 | Pieniak, et al. | Mar. 4, 1986 |
| 4,676,784 | Erdman, et al. | Jun. 30, 1987 |
| 4,731,067 | Le-Khac; Bi | Mar. 15, 1988 |
| 4,855,179 | Bourland, et al. | Aug. 8, 1989 |
| 4,861,539 | Allen, et al. | Aug. 29, 1989 |
| 4,880,868 | Le-Khac; Bi | Nov. 14, 1989 |
| 4,962,172 | Allen, et al. | Oct. 9, 1990 |
| 4,963,638 | Pazos, et al. | Oct. 16, 1990 |
| 5,183,707 | Herron, et al. | Feb. 2, 1993 |
| 5,280,079 | Allen, et al. | Jan. 18, 1994 |
| 5,413,747 | Akers, et al. | May 9, 1995 |
| 5,567,478 | Houben, et al. | Oct. 22, 1996 |
| 5,693,707 | Cheng, et al. | Dec. 2, 1997 |
| 5,698,074 | Barcus, et al. | Dec. 16, 1997 |
| 5,962,068 | Tsuchiya, et al. | Oct. 5, 1999 |
| 5,997,791 | Chou, et al. | Dec. 7, 1999 |
| 6,150,495 | Chou, et al. | Nov. 21, 2000 |
| 6,162,541 | Chou, et al. | Dec. 19, 2000 |
| 6,241,713 | Gross, et al. | Jun. 5, 2001 |
| 6,417,425 | Whitmore, et al. | Jul. 9, 2002 |
| 6,506,696 | Goldstein, et al. | Jan. 14, 2003 |
| 6,645,407 | Kellenberger, et al. | Nov. 11, 2003 |
| 6,689,378 | Sun, et al. | Feb. 10, 2004 |
| 6,773,746 | Bell; Otis Franklin | Aug. 10, 2004 |
| 7,300,965 | Weerawarna, et al. | Nov. 27, 2007 |
| 7,985,819 | Bucevschi et al | Jul. 26, 2011 |

The invention claimed is:

1. A textile composite article comprising textile fibers impregnated by a continuous polymers network creating a pattern of impregnated areas in the textile in which said polymers network penetrates fully within the textile and comprises natural polymer (NP) crosslinked to synthetic polymer (SP) in the absence of non-polymeric crosslinking agent and said textile composite article having a water absorbency by at least 10% higher in comparison to same textile without said polymers network.

2. The textile composite article according to claim 1, being biodegradable.

3. The textile composite article according to claim 1, wherein said synthetic polymer (SP) is selected from linear or branched graft homo- or copolymers made from vinyl acidic monomers such as acrylic acid, maleic anhydride, itaconic anhydride and similar, optionally in association with other types of vinylic monomers that do not necessarily contain carboxylic acid functions.

4. The textile composite article according to claim 1, wherein said SP is a copolymer based on maleic anhydride and/or maleic acid.

5. The textile composite article according to claim 1, wherein said natural polymer (NP) is a biopolymer selected from protein, soybean protein, collagen, collagenic biopolymer, gelatin, collagen hydrolysate, albumin, guar or starch and casein.

6. The textile composite article according to claim 1, wherein said natural polymer (NP) is a biopolymer selected from polypeptides, proteins, polysaccharides, polyesters and lignin (in native forms or modified by chemical or enzymatic hydrolysis).

7. The textile composite article according to claim 1, wherein said natural polymer (NP) is a biopolymer selected from water soluble phospholipids such as lecithin, polypeptides or proteins such as gelatin, albumin, and the like; or polysaccharides such as cellulose, alginate, dextran, chitosan, and the like.

8. The textile composite article according to claim 1, wherein said natural polymer (NP) has amino and/or hydroxyl groups capable of cross-linking to COOH groups in SP under high temperature conditions and for selected periods of time.

9. The textile composite article of claim 1 for use in absorbing products.

10. The textile composite article of claim 9, wherein said absorbing products are selected from the group consisting of cleaning wipes, household or institutional cleaning or maintenance appliances, hand wipes, hand towels, personal, cosmetic or sanitary wipes, baby wipes, facial tissues, hygienic absorbent pads, panties, and wound dressings.

11. A process for preparing the textile composite material of claim 1, which comprises a fabric/textile and a biodegradable superabsorbent polymer, comprising:
   a) preparing an alkaline base solution;
   b) preparing a polymer solution comprising synthetic polymer (SP) in salt form, which is created by mixing the SP and water with the alkaline solution from (a) to obtain the salt form;
   c) preparing under heating of aqueous solution of natural polymer (NP);
   d) mixing under heating and stirring the SP solution obtained in (b) in salt form, with the NP solution obtained in (c) to obtain aqueous stable composite solution of polymers suitable to be used as impregnation mass that confers high water absorbance to textile materials and optionally
   e) adding to the aqueous stable composite solution obtained in (d) at least one auxiliary material selected from the list of plasticizers, surface agents, deodorants, perfume and preservatives;
   f) applying aqueous stable composite solution obtained in step d) or e) on the fabric/textile by foulard, roll coating, reverse roll coating, knife applicator devices or any combination thereof; and
   g) applying heat-driven elimination of water followed by self-crosslinking of SP and NP in the absence of non-polymeric crosslinking agent to form a polymers network creating a pattern of impregnated areas in the fabric/textile,
   wherein the fabric/textile is a nonwoven, woven or knitted textile material made from synthetic fibers, natural fibers, or a mixture of synthetic and natural fibers.

12. The process of claim 11, wherein said synthetic polymers (SP) are copolymers based on maleic anhydride and/or maleic acid.

13. The process of claim 11, wherein said natural polymers (NP) are a biopolymer selected from polysaccharides such as cellulose, alginate, dextran, chitosan, and the like;

polyesters and lignin (in native forms or modified by chemical or enzymatic hydrolysis); guar; starch; water soluble phospholipids such as lecithin; polypeptides or proteins such as gelatin, albumin, soybean protein, collagen, collagenic biopolymer, collagen hydrolysate, and casein.

14. The process of claim 11, wherein said natural polymers (NP) have amino and/or hydroxyl groups capable of cross-linking to COOH groups in SP under high temperature conditions and for selected periods of time.

15. The process of claim 11, wherein said synthetic polymers (SP) are selected from linear or branched graft homo-or copolymers made from vinyl acidic monomers such as acrylic acid, maleic anhydride, itaconic anhydride and similar, optionally in association with other types of vinylic monomers that do not necessarily contain carboxylic acid functions.

16. The process of claim 11, where the heat driven elimination of water is performed at a temperature in a range of 50-90° C. and the self-crosslinking at a temperature in a range of 90-180° C.

17. The textile composite article according to claim 4, wherein said SP is a copolymer of styrene maleic anhydride (SMA), a copolymer of isobutylene and maleic anhydride or a copolymer of methyl vinyl ether and maleic acid.

18. The process of claim 12, wherein said SP is a copolymer of styrene maleic anhydride (SMA), a copolymer of isobutylene and maleic anhydride or a copolymer of methyl vinyl ether and maleic acid.

* * * * *